United States Patent [19]

Wilke et al.

[11] Patent Number: 6,166,150
[45] Date of Patent: Dec. 26, 2000

[54] PROCESS FOR PREPARING AN AQUEOUS DISPERSION OF A POLYACRYLATE-MODIFIED POLYURETHANE-ALKYD RESIN AND THE USE OF SUCH A DISPERSION

[75] Inventors: Guido Wilke; Ulrich Poth; Rolf Seidemann; Vijay Kadambande, all of Münster, Germany

[73] Assignee: BASF Coatings AG, Muenster-Hiltrup, Germany

[21] Appl. No.: 09/269,394

[22] PCT Filed: Sep. 10, 1997

[86] PCT No.: PCT/EP97/04951

§ 371 Date: May 25, 1999

§ 102(e) Date: May 25, 1999

[87] PCT Pub. No.: WO98/13404

PCT Pub. Date: Apr. 2, 1998

[30] Foreign Application Priority Data

Sep. 25, 1996 [DE] Germany .......................... 196 39 325

[51] Int. Cl.[7] ........................ C08F 283/04; C08F 283/00; C08G 18/42; C09D 175/06; C09D 175/16
[52] U.S. Cl. .......................... 525/453; 525/418; 525/454; 525/455; 524/457
[58] Field of Search ..................................... 525/418, 453, 525/454, 455; 524/457

[56] References Cited

U.S. PATENT DOCUMENTS 3,673,140  6/1972  Ackerman et al. ................. 260/22 TN
4,133,786  1/1979  Harris et al. .

FOREIGN PATENT DOCUMENTS

| 0267562 A2 | 3/1988 | European Pat. Off. . |
| 0 305 795 A2 | 8/1988 | European Pat. Off. ...... C08F 283/01 |
| 0437743 A2 | 7/1991 | European Pat. Off. . |
| 0722963 A1 | 7/1996 | European Pat. Off. . |
| WO9719276 A1 | 3/1997 | European Pat. Off. . |
| 32 19 413 A1 | 5/1982 | Germany ......................... C08L 67/08 |
| 32 19 471 A1 | 5/1982 | Germany ......................... C08L 67/08 |
| 33 15 690 A1 | 4/1983 | Germany ........................... C08J 3/06 |
| 4226243 A1 | 2/1994 | Germany . |
| 1117126 | 9/1964 | United Kingdom . |

*Primary Examiner*—David W. Wu
*Assistant Examiner*—K C Egwim

[57] ABSTRACT

A process for preparing binders for one-component paint systems has the following steps: (I) preparation of a polyurethane-alkyd resin component (A) composed of a mixture (a) of (a1) an unsaturated $C_6$–$C_{30}$ fatty acid with at least two non-conjugated double bonds, and (a2) an unsaturated $C_6$–$C_{30}$ fatty acid with at least two conjugated double bonds as esterified side polymer chains of the polyurethane-alkyd component (A); and (b) polyurethane units with anionic groups and/or groups which can be converted into anionic groups as main polymer chains of the polyurethane-alkyd resin component (A); (II) optional neutralisation of the groups in the polyurethane-alkyd resin component (A) which can be converted into anionic groups and their transfer into the aqueous dispersion or solution; and (III) polymerising at least one ethylenically unsaturated, radically polymerisable monomer (c) which has substantially no other reactive functional groups besides the C—C— double bond in the dispersion prepared as under step (II) in the presence of a radical builder as polymerisation initiator.

14 Claims, No Drawings

PROCESS FOR PREPARING AN AQUEOUS DISPERSION OF A POLYACRYLATE-MODIFIED POLYURETHANE-ALKYD RESIN AND THE USE OF SUCH A DISPERSION

BACKGROUND OF THE INVENTION

1. Field of the Invention

The invention relates to a process for preparing an aqueous binder dispersion BM, comprising a polyacrylate-modified polyurethane-alkyd resin with a mixture of unsaturated fatty acids as monomer building blocks, and to the use of such binder dispersions BM in coating compositions for low-yellowing, alcohol-resistant, high-gloss coatings, especially for wood and plastic.

2. Prior Art

Aqueous alkyd resin acrylate dispersions for the preparation of air-drying coatings have been known for a relatively long time and are described, for example, in U.S. Pat. No. 4,133 786 or GB-A-1 117 126.

DE-A-32 19 413 describes aqueous alkyd resin emulsions whose emulsified resin component consists of a mixture of an acrylate-modified air-drying alkyd resin having acid groups which are partially neutralized prior to emulsification in water and of a urethane-modified air-drying alkyd resin having tertiary amino groups.

DE-A-32 19 471 likewise embraces aqueous alkyd resin emulsions whose emulsified resin component consists of a mixture of acrylate-modified air-drying alkyd resin with partially neutralized acid groups and of a urethane-modified air-drying alkyd resin having tertiary amino groups, the acrylate-modified alkyd resin, unlike that employed in DE-A-32 19 413, additionally containing polyethylene glycol.

DE-A-33 15 690 describes a process for preparing air-drying aqueous emulsions of urethanemodified alkyd resins and/or urethane oils, where first of all a graft copolymer comprising unsaturated polyester, and acrylate monomers as emuslifier, are mixed with the air-drying urethane-modified alkyd resin and then the mixture obtained in such a manner is emulsified in water.

EP-A-0 267 562 describes a process for preparing water-thinnable air-drying paint binders on the basis of vinyl- and/or (meth)acrylic-modified alkyd resin emulsions, where a mixture of vinyl and/or (meth)acrylic monomers is polymerized to a degree of conversion of at least 95% in the presence of an aqueous solution or emulsion of an epoxy resin ester and/or urethane alkyd resin and/or alkyd resin which is soluble in water following at least partial neutralization, which have a content of fatty acids and which are grafted with methacrylic acid and with further monomers onto a portion of the unsaturated fatty acids, and in the presence of a free-radical initiator.

EP-A-0 305 795 embraces a process for preparing aqueous graft copolymer emulsions where, in a step (a), a polymer is prepared by esterifying unsaturated fatty acids, polyols having 3 to 6 hydroxyl groups and, if desired, polyethylene glycol and then graft-copolymerizing (meth)acrylic acid and nonfunctional, vinylically unsaturated monomers onto the unsaturated fatty acids, adding, in a step (b), water to said polymer following neutralization of the carboxyl groups of the (meth)acrylic acid with ammonia and/or organic amines, and, in a step (c) in this solution, polymerizing vinyl and/or (meth)acrylic monomers which essentially carry no functional group other than the ethylenically unsaturated double bond.

The above-listed laid-open publications all describe alkyd resin acrylate dispersions having a core-shell structure, where the core consists of a hydrophobic alkyd resin segment and the shell, which is grafted onto the core, consists of carboxyl-containing, neutralizable and thus hydrophilicizable acrylate segments. Storability is the principal advantage cited for this type of binder. The preparation of such polymers is highly complex (cf. in particular EP-A-0 267 562 and EP-A-0 305 795).

SUMMARY OF THE INVENTION

In the case of so-called "do-it-yourself" decorating paints, which are employed principally in the painting of wood, plastic or metal substrates, there is a need for low-solvent one-component systems which ensure rapid curing of the paint at room temperature. The intention, furthermore, with such decorating paints is to produce low-yellowing, weather-stable, scratch-resistant and high-gloss coatings which, in addition, are of high resistance to water and to alcohol.

It has surprisingly been found that paints comprising paint binders based on polyacrylate-modified polyurethane-alkyd resins lead to paint films having the advantageous properties described above if the paints comprise aqueous binder dispersions BM which are prepared by the following multistage process:

in a first stage the polyurethane-alkyd resin component (A) is prepared, which is composed of
(a) from 5 to 50% by weight of a mixture comprising:
(a1) from 90 to 30 parts by weight of an unsaturated C6 to C30 fatty acid having at least two nonconjugated double bonds, and
(a2) from 10 to 70 parts by weight of an unsaturated C6 to C30 fatty acid having at least two conjugated double bonds,
as esterified polymer side chains of the polyurethane-alkyd resin component (A), and
(b) from 95 to 50% by weight of polyurethane units with monomer building blocks having anionic groups, or groups which can be converted by neutralization into anionic groups, as polymer main chains of the polyurethane-alkyd resin component (A);

in a second stage of the process, the polyurethane-alkyd resin component (A) is converted, with or without neutralization, into an aqueous dispersion or solution, after which in a third stage, to prepare the binder dispersion BM comprising the acrylate-modified polyurethane-alkyd resin (A'), polymerization is conducted in the solution or dispersion prepared in accordance with the second stage, comprising the polyurethane-alkyd resin (A), at least one ethylenically unsaturated monomer (c) which has essentially no reactive functional group other than the double bond, or a mixture of such monomers (c), in the presence of a free-radical polymerization initiator.

The polyurethane-alkyd resin components (A) preferably have acid numbers of between 15 and 40 mg of KOH/g, particularly preferably between 20 and 30 mg of KOH/g, and preferably have hydroxyl numbers of between 90 and 150 mg of KOH/g, particularly preferably between 100 and 130 mg of KOH/g. The content of urethane groups in the polyurethane-alkyd resin components (A) is preferably between 5 and 15% by weight based on (A), particularly preferably between 5 and 10% by weight.

Particularly preferred ethylenically unsaturated monomers (c) which carry essentially no other reactive functional groups and which are used in the third stage of the preparation of the aqueous binder dispersion BM are (meth) acrylic esters, vinylaromatic compounds and vinyl esters.

The aqueous binder dispersions BM contain preferably less than 2% by weight of solvents, particularly preferably less than 1% by weight, based on the binder dispersion BM.

In addition, the aqueous binder dispersions BM can contain between 0 and 20% by weight, preferably between 0 and 10% by weight, based on (A), of additional crosslinker components (B) which are preferably able to react at room temperature with the excess hydroxyl and/or carboxyl groups of the polyurethane-alkyd resin component (A).

DETAILED DESCRIPTION OF THE INVENTION

Stage (I) of the Novel Process: the Preparation of the Polyurethane-alkyd Resin (A)

The mixture (a) which constructs the polymer side chains of the polyurethane-alkyd resin component (A) and which comprises unsaturated fatty acids (a1) having at least two nonconjugated double bonds and unsaturated fatty acids (a2) having at least two conjugated double bonds is present in proportions of from 5 to 50% by weight, calculated as triglyceride (oil length), preferably in proportions of from 10 to 45% by weight, in the polyurethane-alkyd resin component (A).

The components (a1) and (a2) are referred to in general as drying fatty acids and have preferably between 6 and 30, particularly preferably between 12 and 24, carbon atoms per molecule.

As examples of the unsaturated fatty acids (a1) having at least two nonconjugated double bonds there may be mentioned: linolenic acid and, preferably, linoleic acid as C18 fatty acids.

Examples of the unsaturated fatty acids (a2) having at least two conjugated double bonds, also called conjuene fatty acids, mention may preferably be made of the conjugated linoleic acid having two double bonds, in conjugation, on the 9th and on the 11th carbon atom of the C17-alkyl chain of the C18 fatty acid.

The fatty acids (a1) and (a2) are present, for example, in natural oils, such as linseed oil, soya oil, safflower oil, cotton seed oil or castor oil, sunflower oil, ground nut oil, wood oil and ricinene oil. The fatty acids obtained therefrom are linseed oil fatty acid, safflower oil fatty acid, tall oil fatty acid, cotton seed fatty acid, ground nut oil fatty acid, wood oil fatty acid, ricinenic fatty acid or, preferably, sunflower oil fatty acid.

The polyurethane units (b) which construct the polymer main chain are composed of polyesterpolyols (b1) and polyisocyanates (b2) in such a way that the content of urethane groups in the polyurethane-alkyd resins is preferably between 5 and 15% by weight based on (A), particularly preferably between 5 and 10% by weight based on (A). The acid numbers of the polyesterpolyols (b1) are preferably between 1 and 10 mg of KOH/g, particularly preferably between 2 and 5 mg of KOH/g, while the hydroxyl number of the polyesterpolyols (b1) is preferably between 100 and 250 mg of KOH/g, particularly preferably between 140 and 160 mg of KOH/g. The number-average molecular weights Mn of the polyesterpolyols are between 800 and 2000 daltons, preferably between 1000 and 1500 daltons. The polyesterpolyols (bi) are composed of alcohol building blocks (b11) and acid building blocks (b12).

As alcohol building blocks (b11) it is preferred to use aliphatic, cycloaliphatic and/or araliphatic alcohols having 1 to 6, preferably 1 to 4, hydroxyl groups attached to nonaromatic carbon atoms. Examples of (b11) which may be mentioned are: ethylene glycol, 1,2- and 1,3-propanediol, 1,2-, 1,3- and 1,4 butanediol, 2-ethyl-1,3-propanediol, 2-methylpropanediol, 2-butyl2-ethylpropanediol, 2-ethyl-1, 3-hexanediol, 1,3 neopentyl glycol, 2,2-dimethyl-1,3-pentanediol, 1,6 hexanediol, 1,2- and 1,4-cyclohexanediol, 1,2- and 1,4 bis(hydroxymethyl)cyclohexane, bis(4-hydroxycyclohexyl)methane, adipic acid bis-(ethylene glycol ester), ether alcohols, such as di- and triethylene glycol, dipropylene glycol, perhydrogenated bisphenols, 1,2,4-butanetriol, 1,2,6-hexanetriol, trimethylolethane, trimethylolpropane, trimethylolhexane, glycerol, pentaerythritol, dipentaerythritol, mannitol and sorbitol, and also chain-terminating monoalcohols having 1 to 8 carbon atoms such as propanol, butanol, cyclohexanol, benzyl alcohol and hydroxypivalic acid. Preferably employed alcohols (b11) are: glycerol, trimethylolpropane, neopentyl glycol and pentaerythritol.

In order to obtain water-dispersible polyurethane-alkyd resin components (a) at least some of the monomer building blocks (b11) employed are polyols having anionic groups or groups which can be converted into anionic groups, such as, for example, carboxyl groups. It is preferred for this purpose to employ alkanoic acids having from one to two hydroxyl substituents. These polyols generally have 1 to 3, preferably one carboxyl group in the molecule, and preferably from 3 to 15 carbon atoms per molecule.

Examples of such compounds are: hydroxypivalic acid, dihydroxypropionic acid, dihydroxysuccinic acid, dihydroxybenzoic acid and/or dihydroxycyclohexanemonocarboxylic acid. Particular preference as the monomer building block is given to the 2,2-dimethylolalkanoic acid having alcohol radicals of up to 20 carbon atoms, such as, for example, 2,2-dimethylolacetic acid, 2,2-dimethylolpentanoic [sic] acid or, with very particular preference, 2,2-dimethylolpropionic acid. The proportion of the carboxyl-containing monomers among the totality of the polyol building blocks (b11) is chosen such that the acid number of the polyurethane-alkyd resin component (A) is preferably between 15 and 40 mg of KOH/g, particularly preferably between 20 and 30 mg of KOH/g.

As acid building blocks (b12) it is preferred to employ aliphatic, cycloaliphatic saturated or unsaturated and/or aromatic polybasic carboxylic acids, particularly preferably di-, tri- and tetracarboxylic acid, and also their anhydrides and/or their esters. Examples of (b12) which may be mentioned are: phthalic acid (anhydride), isophthalic acid, terephthalic acid, tetrahydro- or hexahydrophthalic acid (anhydride), endomethylenetetrahydrophthalic acid, succinic acid, glutaric acid, sebacic acid, azelaic acid, trimellitic acid, trimellitic anhydride, pyromellitic acid (anhydride), fumaric and maleic acid. The most commonly employed building blocks (b12) are isophthalic acid and phthalic acid (anhydride).

Preferred isocyanates (b2) are those having 4 to 25 carbon atoms and from 2 to 4 isocyanate groups per molecule. Particular preference is given to aliphatic, cycloaliphatic, araliphatic or aromatic diisocyanates (b2), for example: 1,2-ethylene diisocyanate, 1,4-tetramethylene diisocyanate, 1,6-hexamethylene diisocyanate, 2,2,4- and/or 2,4,4-trimethyl-1,6-hexmethylene diisocyanate, 1,12-dodecane diisocyanate, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethyl-cyclohexyl isocyanate (isophorone diisocyanate), 2,5-and 3,5-bis(isocyanatomethyl)-8-methyl-1,4,-methano-decahydronaphthalene [sic], 2,6-bis-(isocyanato)-4,7- methano-hexahydroindane, dicyclohexyl 2,4'- and 4,4'-diisocyanate, 2,4- and 2,6-hexahydrotolylene diisocyanate, perhydro-2,4'- and -4,4'-diphenylmethane diisocyanate, 1,3- and 1,4-phenylene diisocyanate, 4,4'-diisocyanatobiphenyl, 4,4'-diisocyanato-3,3'-dimethoxybiphenyl, 4,4'-diisocyanato-3,3'-dimethylbiphenyl, 4,4'-diisocyanato-3,3'-dipenylbiphenyl [sic], 2,4'- and 4,4'-disocyanato-diphenylmethane [sic], naphthylene 1,5-diisocyanate, tolylene diisocyanate, such as 2,4- and/or 2,6-tolylene diisocyanate, N,N'-(4,4'-dimethyl-3,3'-diisocyanato-diphenyl)uretdione, m-xylylene diisocyanate, tetramethylxylylene diisocyanate or triisocyanates, such as 2,4,4'-triisocyanatodiphenyl ether, 4,4',4"-triisocyanatotriphenylmethane, tris (4-isocyanatophenyl) thiophosphate. Particular preference is given in general as building blocks (b2) to the readily industrially available aliphatic or cycloaliphatic polyisocyanates, such as, in particular, hexamethylene diisocyanate, 4,4'-di (isocyanatocyclohexyl)methane and isophorone diisocyanate, and also the araliphatic tetramethylxylylene diisocyanate.

The polyurethane-alkyd resins (A) are preferably compared in a two-stage or multistage process which embraces first of all the synthesis of the polyesterpolyol component (b1), comprising the unsaturated fatty acids (a1) and (a2) as monomer building blocks, after which (b1) is reacted in a further process step with the polyisocyanate (b2) to give the polyurethane-alkyd resin component.

The preparation of the component (b1), which can also be referred to as the hydroxy-functional alkyd resin, is conducted in the presence of from 0.0; to 2.5% by weight, based on the alkyd resin component (b1), of catalysts, such as preferably dialkyl- or dialkoxytin oxides, with removal of the water of reaction by azeotropic distillation, in such a way that the alkyd resin (b1) has an acid number of preferably less than 10 mg of KOH/g, particularly preferably less than 5 mg of KOH/g.

In a further process step the component (b1) prepared in this way is reacted with the polyisocyanate (b2) in proportions by weight such that the resulting polyurethane-alkyd resin (A) has a content of urethane groups of preferably between 5 and 15% by weight based on (A), particularly preferably between 5 and 10% by weight. The reaction is preferably conducted until free isocyanate can no longer be detected. The acid number of the polyurethane-alkyd resin (A) is preferably between 15 and 40 mg of KOH/g, particularly preferably between 20 and 30 mg of KOH/g, while the hydroxyl group number is preferably between 90 and 150 mg of KOH/g, particularly preferably between 100 and 130 mg of KOH/g.

In a preceding reaction step the polyisocyanates (b2) are preferably reacted with hydroxycarboxylic acids as present, for example, in the list given above for the synthesis of the hydroxy-functional alkyd resin (b1). This serves preferably to control the acid number in the polyurethane-alkyd resin (A).

The number-average molecular weights Mn (determined by gel permeation chromatography) of the polyurethane-alkyd resin (A) is in general between 1000 and 100,000, preferably between 2000 and 50,000 and, with particular preference, between 2000 and 20,000 daltons.

In principle, the preparation of the polyurethane-alkyd resin (A) in stage (I) can be conducted in bulk or in solution. The solvents used for the preparation of polyurethanealkyd resin (A) are preferably inert toward isocyanate and dilutable in water, examples being ketones, esters or ethers, such as acetone, N-methylpyrrolidone, dipropylene glycol dimethyl ether, ethyl ethoxypropionate or, with particular preference, methyl ethyl ketone.

If desired it is also possible to employ solvents which are dilutable in water but not inert toward isocyanate, examples being monofunctional alcohols, such as butanol, n-propanol, isopropanol; ether alcohols, such as butoxyethanol, methoxypropanol, ethoxypropanol, butoxypropanol; dialcohols, such as ethylene glycol; trialcohols, such as glycerol.

When using alcohols as solvents it should be borne in mind that these may occur as co-reactants in the preparation of the components (b1) and in the subsequent reaction of (b1) with (b2) to give (A).

It is likewise possible to employ solvents which are inert toward isocyanate and are of little or no dilutability in water, such as ethers, esters etheresters or ketones.

Stage (II) of the Novel Process: the Neutralization of Polyurethane-alkyd Resin (A) and its Conversion into the Aqueous Dispersion or Solution In stage (II) of the novel process the acid groups of the dissolved polyurethane-alkyd resin (A) are neutralized partially or completely: preferably with ammonia and/or organic amine, for example triethylamine, N-methylmorpholine or amino alcohols, such as dimethylisopropanolamine, 2-amino-2-methyl-1-propanol or, preferably, dimethylethanolamine.

To prepare the aqueous dispersion or solution in accordance with stage (II) the polyurethane-alkyd resin (A), after partial or complete neutralization of the acid groups beforehand and, if desired, following the addition of small amounts of organic auxiliary solvents, is converted with water into an aqueous dispersion or solution having a solids content of preferably between 35 and 45% by weight, particularly preferably between 37 and 42% by weight, of polyurethane-alkyd resin, based on the aqueous dispersion.

Stage (III) of the Novel Process: the Preparation of the Aqueous Binder Dispersion EM comprising the Acrylate-modified Polyurethane-alkyd Resin (A')

As monomers (c) for the preparation of the aqueous binder dispersion use is made of essentially ethylenically unsaturated compounds which carry essentially no reactive group other than the C—C double bond.

Preferred monomers (c) are acrylic and/or methacrylic esters of C1 to C12 alcohols, for example ethyl (meth) acrylate, propyl (meth)acrylate, isopropyl (meth)acrylate, isobutyl (meth)acrylate, tert-butyl (meth)acrylate, amyl (meth)acrylate, hexyl (meth)acrylate, octyl (meth)acrylate, decyl (meth)acrylate, dodecyl (meth)acrylate and, preferably, methyl (meth)acrylate, butyl (meth)acrylate and 2-ethylhexyl (meth)acrylate, aromatic vinyl compounds, for example alphamethylstyrene, vinyltoluene or, preferably, styrene, and also vinyl esters, for example vinyl acetate or vinyl propionate, or mixtures of said monomers. In minor amounts, for example up to 5% by weight based on the overall amount of monomers (c), it is also possible to use monomers having functional groups, especially hydroxyl-containing monomers such as, for example, 2-hydroxyethyl (meth)acrylate.

To prepare the novel aqueous binder dispersion, the aqueous dispersion or solution of the polyurethanealkyd resin (A), prepared in stage (II), is initially introduced into the reaction vessel, heated to a temperature between 50 and 100 degrees C., preferably between 60 and 90 degrees C., and the monomer or monomer mixture (c) is metered in together with a free-radical polymerization initiator such as, for example, azo compounds and also inorganic or organic peroxides, and if desired with other auxiliaries, for example emulsifiers or auxiliary solvents, such as alcohols or glycol ethers, with stirring and over a period of from 0.5 to 8 hours, preferably from 0.75 to 4 hours. After the end of the addition of the monomer or monomer mixture (c) the temperature in the reactor is held at reaction temperature for about 2 to 8 hours longer in order to obtain as complete as possible a degree of conversion of the monomer or monomer mixture (c).

The resulting aqueous binder dispersions BM contain less than 5% by weight, preferably less than 2% by weight and, with particular preference, less than 1% by weight of solvent.

The resulting novel binder dispersion BM comprises the acrylate-modified polyurethane-alkyd resin (A') in a content of from 20 to 75% by weight, preferably from 25 to 65% by weight and, with particular preference, from 30 to 60% by weight, as solids.

The Formulation of Paints Comprising the Aqueous Binder Dispersion BM Prepared by the Novel Process Up to a proportion of 25% by weight, preferably up to 15% by weight, based on the solids content of the aqueous binder dispersion BM, paints based on BM can include further binder resins, for example (meth)acrylic copolymers, polyester resins and/or polyurethane resins other than the acrylate-modified polyurethane-alkyd resin (A').

In addition to the novel binder dispersion BM the paint can comprise at least one inorganic and/or organic color pigment or special-effect pigment and, if desired, a filler as well. Examples of color-imparting pigments or fillers are: titanium dioxide, iron oxide pigments, carbon blacks, silicon dioxide, aluminum silicate, anticorrosion pigments, such as lead compounds and chromate compounds, barium sulfate, mica, talc, kaolin, chalk, azodye pigments, phthalocyanine dye pigments or ultramarine blue.

Examples of special-effect pigments are: metal pigments, for example comprising aluminum, copper or other metals, interference pigments, for example metal oxide-coated metal pigments, coated micas, for example titanium oxide-coated mica, and graphite special-effect pigments.

The pigments are generally employed in the form of a paste which is, for example, commercially available or which is preferably formulated by combining a portion of the binder resin, water, wetting agent and pigment, together if desired with a filler, grinding this combination in a unit familiar to the skilled worker, for example a bead mill, and adjusting the resulting mill base to a defined pigment particle size, preferably between 10 and 15 micrometers. In the course of this process it must be ensured that the stability of the aqueous dispersion is maintained during the milling process. It is possible if desired to add further dispersing auxiliaries for this purpose. The weight ratio of pigment to binder is in general between 0.01:1 and 4:1, preferably between 0.3:1 and 1:1.

Furthermore, the paint generally includes rheology-controlling agents, for example polymer microparticles, inorganic phyllosilicates, for example aluminum-magnesium phyllosilicates, sodium-magnesium phyllosilicates and sodium-magnesium-fluorolithium phyllosilicates of the montmorillonite type, and also associated thickeners, based for example on polyurethane or cellulose, polyvinyl alcohol, poly(meth)acrylamide or polymers having ionic groups, for example poly(meth)acrylic acid.

In minor amounts of up to 20% by weight, preferably of up to 10% by weight, based on the binder (A'), the novel paint formulations may comprise components (B) which at the application temperatures crosslink the binders chemically, in other words with the formation of covalent bonds. The components (B) preferably react with the free hydroxyl groups of the acrylate-modified polyurethane-alkyd resin (A') during development of a three-dimensional network. Examples of such crosslinking components (B) are: polyisocyanates, as stated as component (b2) of the polyurethane-alkyd resin(A), or polyepoxides.

The novel paint formulations are applied by means of the techniques customary per se, for example dipping, knife coating, rolling or spraying, to the substrates which are to be coated, in the course of which the film which forms is crosslinked. Crosslinking takes place at temperatures between 0 and 100 degrees C., preferably between 10 and 60 degrees C. and, with particular preference, between 15 and 40 degrees C. (room temperature conditions). The film thicknesses of the applied novel paints depend on the use and on the paint formulation. For example, clearcoats have film thicknesses of between 40 and 100 micrometers, pigmented basecoats or topcoats have film thicknesses of between 50 and 120 micrometers, coatings as filler or protection against mechanical stress have film thicknesses of between 70 and 160 micrometers, and primers have film thicknesses of between 50 and 110 micrometers.

Any desired bases are suitable as substrates for the novel paint formulations, examples being metal substrates, such as iron, steels, aluminum or zinc. Suitable nonmetallic substrates are mineral substrates, for example concrete, plasters or glass, wood or plastics, for example polyolefins, polyurethanes, polystyrene, polycarbonate, poly(meth)acrylates or polyvinyl chloride. If desired, the substrates can have previous coatings.

The novel paint formulations can be applied alone or together with other coated compositions in one or more stages. In applying the paint, application can be made to a dried coated substrate or to a wet coated substrate, it being possible in the case of the latter technique to interpose a short ventilation phase. With the multistage coating process, the novel paint can be applied alone in a plurality of stages, in which case the coated substrate prepared in the initial stage can be dry or wet.

The examples which follow are intended to illustrate the invention further.

EXAMPLES

Example 1

Preparing the Polyurethane-alkyd Resin (A) according to Stage (I) of the Novel Process 80 g of neopentyl glycol, 647 g of trimethylolpropane, 331 g of isophthalic acid, 308 g of hexahydrophthalic anhydride, 792 g of a mixture of customary commercial linoleic acid and C18 fatty acid having conjugated double bonds, the linoleic acid making up a proportion of 75% by weight of the mixture and the C18 fatty acid having conjugated double bonds making up the remainder to 100% by weight, are heated in a reactor in the presence of 0.48 g of dibutyltin oxide as catalyst and 40 g of xylene as entraining agent, with removal of the water of reaction by azeotropic distillation, until an acid number of 4 mg of KOH/g is reached. After cooling, the polyesterpolyol (b1), comprising the unsaturated fatty acids (a1) and (a2), is dissolved in 212 g of methyl ethyl ketone.

To prepare the polyisocyanate (b2), 303 g of tetramethylxylylene diisocyanate and 83 g of dimethylolpropionic acid are heated in 809 g of methyl ethyl ketone in an appropriate reaction vessel at from 80 to 82 degrees C. until the NCO content of the preadduct (b2) is 4.4%.

Then, to prepare the polyurethane-alkyd resin (A), the solution of the polyisocyanate (b2) is cooled to 50 degrees C., 1285 g of the polyesterpolyol (b1) are added, and reaction is carried out at 80 degrees C. until free isocyanate can no longer be detected.

Example 2

Neutralizing the Polyurethane-alkyd Resin (A) and Converting it into the Aqueous Dispersion according to Stage (II) of the Novel Process For neutralization, 44 g of dimethylaminoethanol are added to the reaction mixture of Example 1, containing the polyurethane-alkyd resin (A), and the mixture is dispersed in 1050 g of deionized water. The methyl ethyl ketone is then removed by azeotropic distillation to a residual content of 0.78% by weight, based on the end product, and the dispersion is adjusted with deionized water to a content of polyurethane-alkyd resin (A) of 40% by weight.

Example 3

Preparing the Aqueous Binder Dispersion EM comprising the Acrylate-modified polyurethane-alkyd Resin (A') according to Stage (III) of the Novel Process 222.75 g of the dispersion of the polyurethane-alkyd resin (A), prepared according to Example 2, are weighed out into a reactor appropriate for free-radical reaction, with stirrer, condenser, thermometer and feed vessel, and are heated to 80 degrees C. A mixture of 4.95 g of n-butyl acrylate, 2.475 g of methyl methacrylate and 2.375 g of styrene is metered in with rapid stirring over the course of 1 hour with stirring. At the same time, in a separate feed stream, 1 g of tert-butyl peroxyethylhexanoate is metered in likewise over the course of 1 hour. After the end of the metered addition the mixture is stirred for continuing reaction at 80 degrees C. for 8 hours more. The result is the aqueous binder dispersion BM of the acrylate-modified polyurethane-alkyd resin (A').

Example 4

Preparing a White Pigment Paste 18 g of the binder dispersion BM of Example 3 are mixed, following the addition of 6 g of deionized water and 8.9 g of a customary commercial dispersant based on anionic and nonionic constituents (Disperse Ayd W22® from the company Krahn Chemie GmbH), with 60 g of titanium dioxide pigment (rutile type R-HD2® from the company Tioxide). This mixture is adjusted with deionized water to a solids content of 70% and is dispersed in a bead mill to a pigment particle diameter of from 10 to 15 micrometers.

Example 5

Preparing a Water-thinnable White Gloss Paint 1.8 g of siccative mixture consisting of strontium octoate, cobalt octoate and calcium octoate (50% by weight solids content, Siccatol® 938 from the company AKZO) are dispersed in 64 g of the binder dispersion BM of Example 3. Then 21 g of the white pigment paste of Example 4, 4 g of butyl glycol, 0.5 g of a customary commercial thickener (polyurethanebased, 25% by weight solids content, Rheolate® 278 from the company Kronos Titan GmbH) and 0.3 g of a customary commercial defoamer (polysiloxane-based, Byk® 024 from the company Byk Chemie) are added with stirring. Subsequently, 5 g of a nonionic wax emulsion (Aquacer® 535 from the company Byk Cera Chemie B. V.) and a digested mixture of 0.3 g of a rheological additive (Bentone® LT from the company Kronos Titan GmbH) and 3.3 g of deionized water are added with stirring. An application viscosity of from 950 to 1050 mPas is subsequently established using deionized water.

Coatings which are produced with the paint of Example 5 are to a large extent low-yellowing, weather-stable, scratch-resistant and high-gloss, and are to a large extent resistant to water and alcohol.

What is claimed is:

1. A multistage process for preparing an aqueous binder dispersion (BM) comprising an acrylate-modified polyurethane-alkyd resin (A'), the process comprising:
   (I) preparing a polyurethane alkyd resin (A) comprising:
      (a) from 5 to 50% by weight of a mixture comprising:
         (a1) from 90 to 30 parts by weight of an unsaturated C6 to C30 fatty acid having at least two nonconjugated double bonds, and
         (a2) from 10 to 70 parts by weight of an unsaturated C6 to C30 fatty acid having at least two conjugated double bonds,
      as esterified polymer side chains of the polyurethane-alkyd resin component (A), and
      (b) from 95 to 50% by weight of polyurethane units with monomer building blocks having anionic groups and/or groups which can be converted by neutralization into anionic groups, as polymer main chains of the polyurethane-alkyd resin component (A),
   (II) neutralizing the amionic groups and/or groups which can be converted into anionic groups and converting the polyurethane-alkyd resin component (A) into an aqueous dispersion or solution, and
   (III) polymerizing at least one ethylenically unsaturated, free-radically polymerizable monomer (c) which has essentially no reactive functional groups other than the C—C double bond, in the aqueous dispersion or solution of stage (II) in the presence of a free-radical polymerization initiator.

2. The process of claim 1, characterized in that component (a) of polyurethane-alkyd resin (A) comprises from 80 to 50% by weight of component (a1) and from 20 to 50% by weight of component (a2).

3. The process of claim 1, wherein component (a1) of polyurethane-alkyd resin (A) comprises linoleic acid and component (a2) comprises a C18 conjuene fatty acid.

4. The process of claim 1 wherein the polyurethane units (b) of polyurethane-alkyd resin (A) are comprised of:
   (b1) polyesterpolyols and
   (b2) polyisocyanates.

5. The process of claim 4, wherein polyesterpolyols (b1) comprise:
   (b11) one or more aliphatic, cycloaliphatic and/or araliphatic alcohols having per molecule 1 to 6 hydroxyl groups attached to nonaromatic carbon atoms, and (b12) one or more aliphatic, cycloaliphatic saturated and/or unsaturated and/or aromatic polybasic carboxylic acids, their anhydrides and/or their esters.

6. The process of claim 1, wherein polyurethane-alkyd resin (A) has an acid number of between 15 and 40 mg of KOH/g and a hydroxyl number of between 90 and 150 mg of KOH/g.

7. The process of claim 1, wherein polyurethane-alkyd resin (A) has a content of urethane groups of between 5 and 15% by weight based on (A).

8. The process of claim 1, wherein monomer (c) is selected from the group consisting of (meth)acrylic esters, vinylaromatic compounds, vinyl esters, and mixtures thereof.

9. The process of claim 1, wherein aqueous binder dispersion (BM) comprises an organic solvent content of less than 2% by weight based on (A').

10. A coating material comprising an aqueous binder dispersion (BM) prepared by the process of claim 1.

11. The coating material of claim 10, wherein aqueous binder dispersion (BM) comprises up to 25% by weight of resins other than polyurethane-alkyd resin (A'), based on (A').

12. The coating material claim 10 wherein the binder dispersion (BM) comprises up to 20% by weight, based on (A'), of a crosslinker component (B) which is able to react at temperatures below 60 degrees C. with the excess hydroxyl and/or carboxyl groups of the polyurethane-alkyd resin component (A').

13. A method of coating a substrate, comprising
applying a coating material according to claim 10 to a substrate comprising a material selected from the group consisting of mineral, metal, woods plastic, and mixtures thereof.

14. The method of claim 13 wherein the subtrate comprises a previously coated substrate.

* * * * *